UNITED STATES PATENT OFFICE.

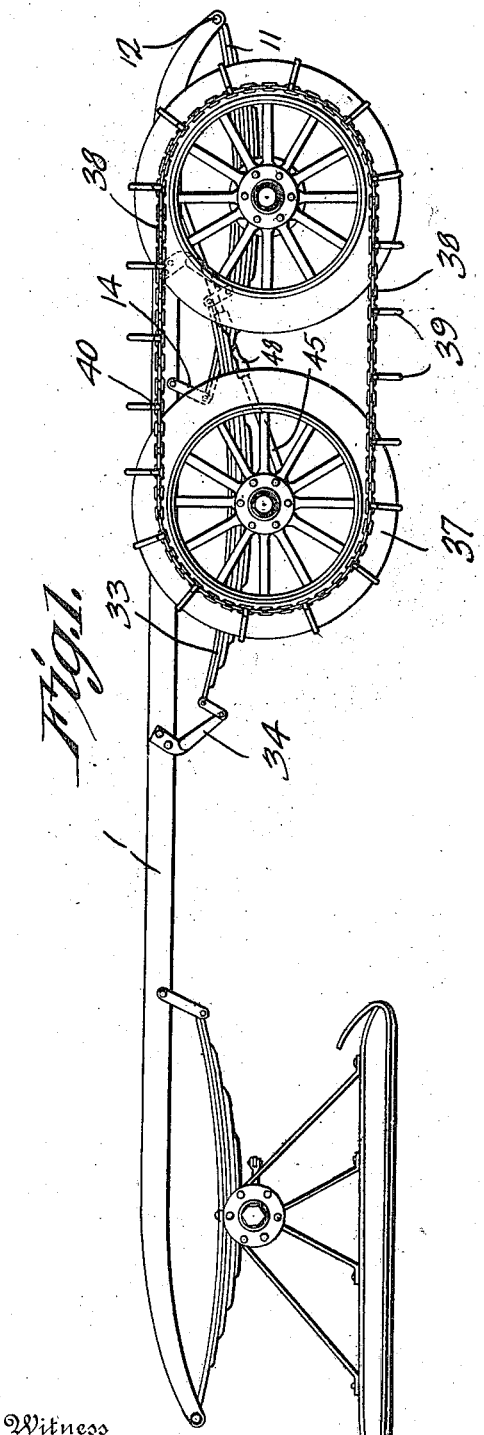

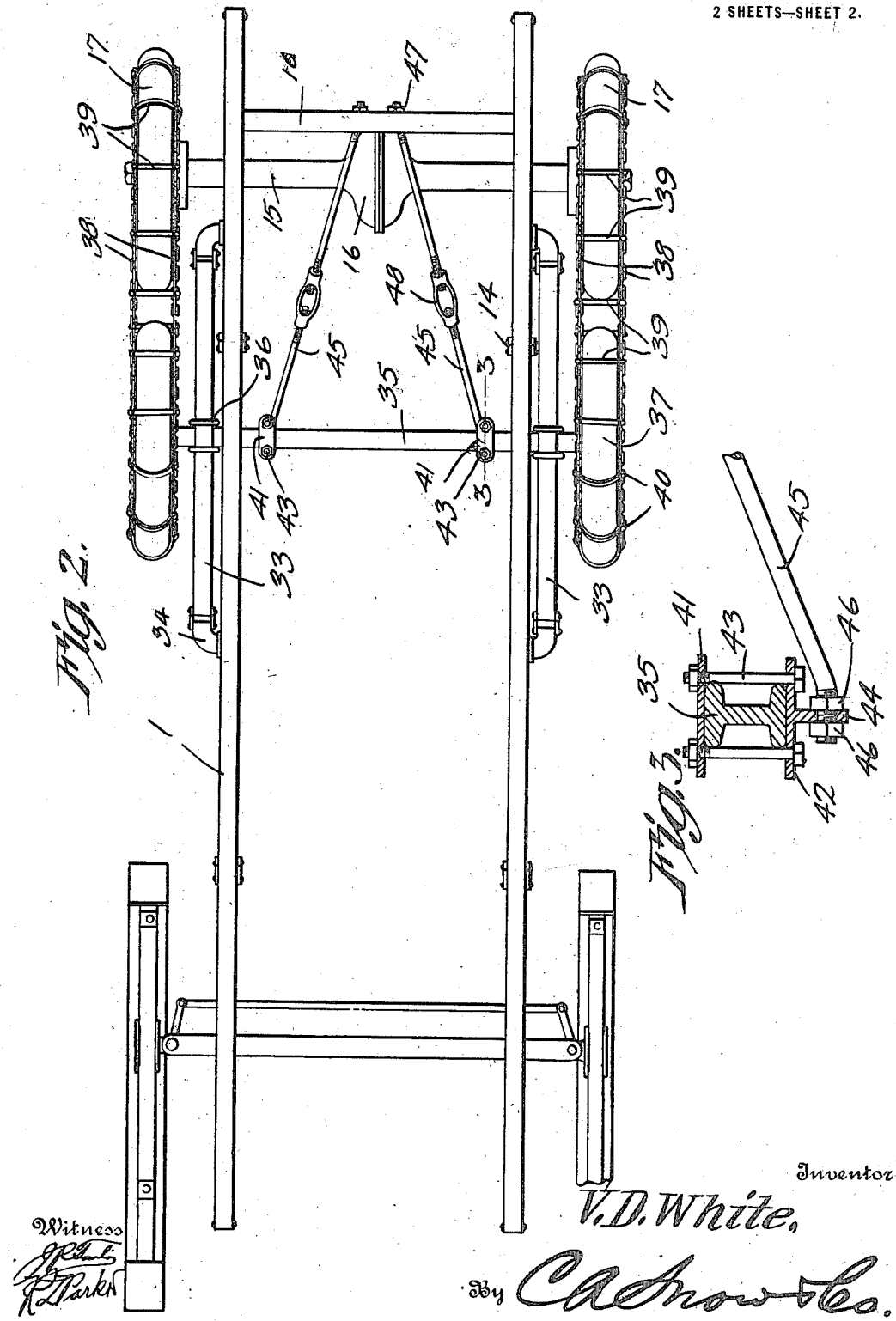

VIRGIL D. WHITE, OF OSSIPEE, NEW HAMPSHIRE.

ATTACHMENT FOR AUTOMOBILES.

1,236,638. Specification of Letters Patent. Patented Aug. 14, 1917.

Application filed February 8, 1917. Serial No. 147,403.

*To all whom it may concern:*

Be it known that I, VIRGIL D. WHITE, a citizen of the United States, residing at Ossipee, in the county of Carroll and State of New Hampshire, have invented a new and useful Attachment for Automobiles, of which the following is a specification.

It is the object of this invention to provide a novel means for assembling a pair of auxiliary wheels with the rear portion of a vehicle frame and to provide novel means for adjusting the auxiliary wheels, thereby to tighten the traction belts which engage the auxiliary wheels and the main rear wheels of the vehicle.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a portion of an automobile frame, whereunto the device forming the subject matter of this application has been applied;

Fig. 2 is a top plan showing an automobile equipped with the device forming the subject matter of this application; and Fig. 3 is a fragmental section taken approximately on the line 3—3 of Fig. 2.

In the accompanying drawings, there appear the side bars 1 of the chassis of a motor-propelled vehicle. Dirigible sleds 50 are connected with the forward ends of the bars 1. The chassis bars 1 may be connected adjacent the rear of the vehicle, by a cross bar 10. The rear springs of the vehicle are shown at 11, the rear ends of the springs 11 being connected as indicated at 12 with the rear ends of the chassis bars 1, and the forward ends of the springs 11 being united by means of hangers 14 with the bars 1. The rear axle casing appears at 15 and carries the usual differential 16, the rear axle casing 15 connected with the rear springs 11. The rear wheels of the vehicle appear at 17.

The numeral 33 denotes a pair of auxiliary springs, the ends of which are connected, by means of hangers 34, with the chassis bars 1. An auxiliary axle 35 is provided, the same being united by means of clips 36 with the springs 33. Journaled on the ends of the auxiliary axle 35 are auxiliary wheels 37. The wheels 37 and the rear wheels 17 of the vehicle are engaged with endless traction belts which may be variously constructed. In the present instance, the traction belts comprise parallel side chains 38 connected by rigid, arched traction cleats 39, the ends 40 of which are engaged through certain of the links of the side chains 38. It is to be understood that any mechanical equivalent for the rigid arched traction cleats 39 may be substituted therefor.

Mounted on the auxiliary axle 35 are clips which may be made as the exigencies of the proposed use or the taste of the manufacturer may demand. In the present instance, the clips include top plates 41 and bottom plates 42, connected by bolts 43. The bottom plates 42 are equipped with depending ribs 44, through which pass the forward ends of radius rods 45, the forward ends of the rods 45 being held to the ribs 44 by means of nuts 46. The rear ends of the radius rods 45 will be connected with the vehicle frame in various ways, depending upon the make of the automobile to which the device forming the subject matter of this application is applied. If the vehicle frame includes such an element as the cross bar 10, then the rear ends of the radius rods 45 will pass through this cross bar and be secured thereto by means of nuts 47, or in any other suitable way. Interposed in the radius rods 45 are turnbuckles 48, the radius rods, therefore, being longitudinally extensible and contractible.

Owing to the fact that the longitudinally extensible radius rods 45 are provided, the auxiliary axle 35 may be moved forwardly and rearwardly, so as to tighten up the traction belts, comprising the side chains 38.

When the rear wheels 17 are power driven, in the usual way, motion will be transmitted to the auxiliary wheels 37 by means of the side chains 38, and an unusually positive and effective drive will be afforded. Owing to the fact that the wheels 17 and 37 are connected by the side chains 38, there exist, between the said wheels, horizontally movable elements which will exert a tractive force on the ground.

Having thus described the invention, what is claimed is:—

1. In a device of the class described, a vehicle frame; rear wheels carried by the vehicle frame; springs extended in front of the rear wheels; means for connecting the springs with the frame; an axle disposed transversely of the springs; means for connecting the axle with the springs for adjustment longitudinally of the springs and longitudinally of the vehicle; auxiliary wheels journaled on the axle; traction belts connecting the auxiliary wheels with the rear wheels; and longitudinally extensible radius rods connecting the axle with the vehicle frame.

2. In a device of the class described, a vehicle frame; rear wheels carried by the vehicle frame; springs extended in front of the rear wheels; means for connecting the springs with the frame; an axle disposed transversely of the springs; means for connecting the axle with the springs for adjustment longitudinally of the springs and longitudinally of the vehicle; auxiliary wheels journaled on the axle; and traction belts connecting the auxiliary wheels with the rear wheels.

In testimony that I claim the foregoing as my own, I have hereto affixed my signature in the presence of two witnesses.

VIRGIL D. WHITE.

Witnesses:
LUCY E. SANBORN,
JOHN E. HAYFORD.